US011354953B2

(12) United States Patent
Hasegawa et al.

(10) Patent No.: US 11,354,953 B2
(45) Date of Patent: Jun. 7, 2022

(54) SERVER, SERVER CONTROL METHOD, SERVER CONTROL PROGRAM, COMMUNICATION TERMINAL, TERMINAL CONTROL METHOD, AND TERMINAL CONTROL PROGRAM

(71) Applicant: TOYOTA JIDOSHA KABUSHIKI KAISHA, Toyota (JP)

(72) Inventors: Hideo Hasegawa, Nagoya (JP); Keiko Kameda, Toyota (JP); Misa Ejiri, Nagoya (JP); Shintaro Naruse, Nisshin (JP); Tadahiro Kashiwai, Nagoya (JP); Naoya Oka, Toyota (JP); Kensuke Koike, Nisshin (JP); Hiroyuki Monji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/176,675

(22) Filed: Feb. 16, 2021

(65) Prior Publication Data
US 2021/0166506 A1 Jun. 3, 2021

Related U.S. Application Data

(63) Continuation of application No. 15/929,187, filed on Dec. 12, 2019, now Pat. No. 10,957,131.

(30) Foreign Application Priority Data

Jan. 22, 2019 (JP) .............................. JP2019-008342

(51) Int. Cl.
*G07C 5/08* (2006.01)
*G06F 16/74* (2019.01)
(Continued)

(52) U.S. Cl.
CPC ......... *G07C 5/0866* (2013.01); *G06F 16/743* (2019.01); *G07C 5/008* (2013.01);
(Continued)

(58) Field of Classification Search
None
See application file for complete search history.

(56) References Cited

U.S. PATENT DOCUMENTS

2007/0118281 A1  5/2007  Adam et al.
2016/0057335 A1  2/2016  Pisz
2018/0373936 A1* 12/2018  Kim .................... G06V 40/103

FOREIGN PATENT DOCUMENTS

CN   101300460 A   11/2008
CN   107077786 A    8/2017
(Continued)

*Primary Examiner* — Christopher Braniff
(74) *Attorney, Agent, or Firm* — Oblon, McClelland, Maier & Neustadt, L.L.P.

(57) ABSTRACT

A server includes a server controller, a server communication unit, and a server storage unit, and is adapted to be connected to a communication terminal via the server communication unit. The server controller stores a video taken by a vehicle during traveling, in the server storage unit, such that the video is associated with a road on which the vehicle is traveling, determines a scheduled traveling route, in response to a request from the communication terminal, obtains the video corresponding to each of one or more roads that constitute the scheduled traveling route, from the server storage unit, and sends the video to the communication terminal, on which the video is displayed.

20 Claims, 9 Drawing Sheets

(51) Int. Cl.
*G07C 5/00* (2006.01)
*H04N 5/77* (2006.01)
*H04N 21/214* (2011.01)
*H04N 21/218* (2011.01)

(52) U.S. Cl.
CPC ............ *H04N 5/77* (2013.01); *H04N 21/214* (2013.01); *H04N 21/218* (2013.01)

(56) References Cited

FOREIGN PATENT DOCUMENTS

| | | |
|---|---|---|
| JP | 2006-099176 A | 4/2006 |
| JP | 2014-202560 | 10/2014 |
| JP | 2017-528819 | 9/2017 |
| WO | WO 2007/057696 A1 | 5/2007 |
| WO | WO 2016/029101 A1 | 2/2016 |

* cited by examiner

| VIDEO | ROAD ID | ROAD WIDTH (m) | VEHICLE TYPE | DATE AND TIME | WEATHER | DIRECTION | CAUTION-NEEDED OBJECT | EVALU-ATION VALUE |
|---|---|---|---|---|---|---|---|---|
| V01 | L01 | 4 | LARGE | DEC. 1 10:00-11:00 | SUNNY | UP | PRESENT | 2 |
| V02 | L02 | 4.5 | LIGHT | DEC. 5 20:00-20:05 | RAIN | DOWN | PRESENT | 5 |
| V03 | L01 | 4 | STAND-ARD | DEC. 7 14:50-15:00 | CLOUDY | UP | ABSENT | 9 |
| V04 | L03 | 3.5 | STAND-ARD | DEC. 7 18:00-18:50 | RAIN | DOWN | PRESENT | 8 |
| V05 | L01 | 4 | LARGE | DEC. 8 16:30-17:00 | SUNNY | UP | PRESENT | 9 |

SERVER, SERVER CONTROL METHOD, SERVER CONTROL PROGRAM, COMMUNICATION TERMINAL, TERMINAL CONTROL METHOD, AND TERMINAL CONTROL PROGRAM

INCORPORATION BY REFERENCE

This application is a continuation of U.S. application Ser. No. 15/929,187, filed Dec. 12, 2019, which claims priority to Japanese Application No. 2019-008342, filed Jan. 22, 2019. The disclosure of U.S. application Ser. No. 15/929, 187, filed Dec. 12, 2019 and Japanese Patent Application No. 2019-008342 filed on Jan. 22, 2019 including the specification, drawings and abstract are incorporated herein by reference in their entirety.

BACKGROUND

1. Technical Field

The disclosure relates to a server, a server control method, a server control program, a communication terminal, a terminal control method, and a terminal control program.

2. Description of Related Art

A system that receives a video from a camera installed on a route along which a vehicle is going to travel, when it receives a video request from a vehicle-mounted device, and sends the video to the vehicle, is known (see, for example, Japanese Unexamined Patent Application Publication No. 2006-099176 (JP 2006-099176 A)).

SUMMARY

Since the above-mentioned camera is a stationary camera installed on a road, it can only send a video of a location where the camera is installed, on a scheduled traveling route of the vehicle, to the vehicle. Therefore, a driver of the vehicle, for example, cannot always sufficiently recognize conditions of the scheduled traveling route from the video thus transmitted. Thus, there is some room for improvement, in the known technology of providing videos concerning the scheduled traveling route of the vehicle.

The disclosure provides a server, a server control method, a server control program, a communication terminal, a terminal control method, and a terminal control program, which can improve the technology of providing videos concerning a scheduled traveling route of a vehicle.

A server according to a first aspect of the disclosure includes a server controller, a server communication unit, and a server storage unit, and is adapted to be connected to a communication terminal via the server communication unit. The server controller is configured to store a video taken by a vehicle during traveling, in the server storage unit, such that the video is associated with a road on which the vehicle is traveling. The server controller is configured to determine a scheduled traveling route, in response to a request from the communication terminal. The server controller is configured to obtain the video corresponding to each of one or more roads that constitute the scheduled traveling route, from the server storage unit, and send the video to the communication terminal, on which the video is displayed.

A server control method according to a second aspect of the disclosure is performed by a server including a server controller, a server communication unit, and a server storage unit, and adapted to be connected to a communication terminal via the server communication unit. The server control method includes the steps of: storing a video taken by a vehicle during traveling, in the server storage unit, such that the video is associated with a road on which the vehicle is traveling; determining a scheduled traveling route, in response to a request from the communication terminal; obtaining the video corresponding to each of one or more roads that constitute the scheduled traveling route, from the server storage unit; and sending the video to the communication terminal, on which the video is displayed.

A server control program according to a third aspect of the disclosure causes a server including a server controller, a server communication unit, and a server storage unit, and adapted to be connected to a communication terminal via the server communication unit, to execute the steps of: storing a video taken by a vehicle during traveling, in the server storage unit, such that the video is associated with a road on which the vehicle is traveling; determining a scheduled traveling route, in response to a request from the communication terminal; obtaining the video corresponding to each of one or more roads that constitute the scheduled traveling route, from the server storage unit; and sending the video to the communication terminal, on which the video is displayed.

A communication terminal according to a fourth aspect of the disclosure includes a controller, a communication unit, a display unit, and a storage unit, and is adapted to communicate with a server via the communication unit. The controller is configured to request the server to send a video corresponding to each of one or more roads that constitute a scheduled traveling route of a vehicle. The controller is configured to obtain the video from the server, and store the video in the storage unit. The controller is configured to display the video obtained from the server, on the display unit, in an order according to the scheduled traveling route.

A terminal control method according to a fifth aspect of the disclosure is performed by a communication terminal including a controller, a communication unit, a display unit, and a storage unit, and adapted to communicate with a server via the communication unit. The terminal control method includes the steps of: requesting the server to send a video corresponding to each of one or more roads that constitute a scheduled traveling route of a vehicle; obtaining the video from the server; storing the video in the storage unit; and displaying the video obtained from the server, on the display unit, in an order according to the scheduled traveling route.

A terminal control program according to a sixth aspect of the disclosure causes a communication terminal including a controller, a communication unit, a display unit, and a storage unit, and adapted to communicate with a server via the communication unit, to execute the steps of: requesting the server to send a video corresponding to each of one or more roads that constitute a scheduled traveling route of a vehicle; obtaining the video from the server; storing the video in the storage unit; and displaying the video obtained from the server, on the display unit, in an order according to the scheduled traveling route.

The server, server control method, server control program, communication terminal, terminal control method, and terminal control program according to the above aspects of the disclosure can improve the technology of providing videos concerning the scheduled traveling route of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of the disclosure will be described with reference to the drawings.

Figure 1:
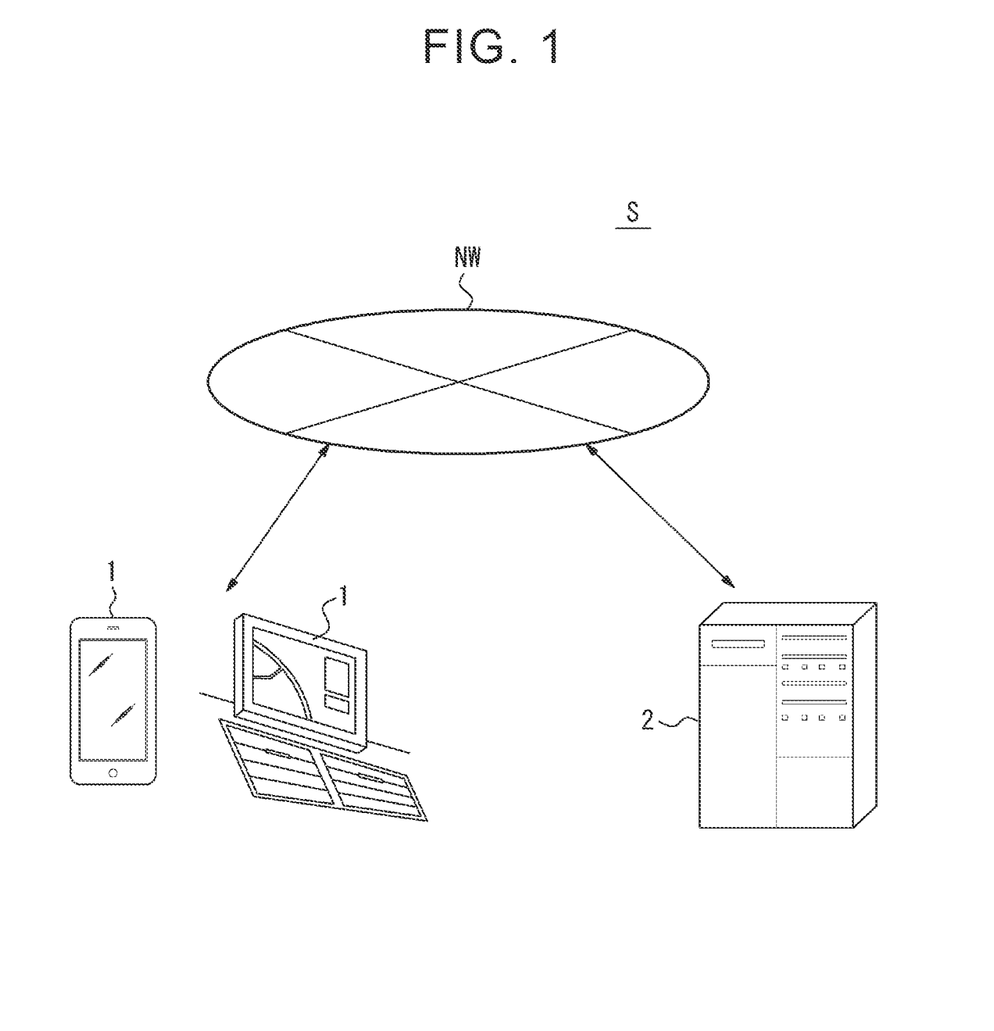
FIG. 1 is an overall view of an information processing system of one embodiment.

FIG. 1 is an overall view of an information processing system S of this embodiment. The information processing system S includes communication terminals 1 and a server 2 which are adapted to be connected to each other. In FIG. 1, two communication terminals 1 and one server 2 are illustrated, for the sake of simplicity of description. However, the number of the communication terminals 1 and that of the server or servers 2 are not limited to these values. The communication terminal 1 may be, for example, a portable communication terminal installed in a vehicle cabin, or any communication terminal, such as a car navigation system, incorporated in a vehicle. The communication terminals 1 and the server 2 are adapted to communicate with each other, via a network NW including a mobile telecommunication network, the Internet, and so forth, for example.

Initially, the summary of processing performed by the information processing system S of this embodiment will be described. The server 2 stores videos taken by any vehicle during traveling, in a server storage unit 22, such that each of the videos is associated with a road on which the vehicle is traveling. One example of the communication terminals 1 is installed at a position in the cabin where it can be viewed from the driver's seat, and is operated by the user. The communication terminal 1 of this embodiment provides car navigation functions via a display unit 17. The user operates the communication terminal 1 before getting on the vehicle, or after getting on the vehicle and before starting, so as to request a search for a desired scheduled traveling route. The communication terminal 1 obtains a video corresponding to each of one or more roads that constitute the scheduled traveling route, from the server storage unit 22, and displays the video.

Thus, according to this embodiment, the information processing system S provides the user with the video as viewed from the vehicle. In this manner, the information processing system S can assist the user to recognize conditions (e.g., whether there is an obstacle, whether the road is wide, etc.) of the scheduled traveling route on which the vehicle is going to travel. Thus, the information processing system S improves the technology of providing videos concerning the scheduled traveling route of the vehicle. Further, government offices, local governments, etc. may obtain the videos, and use them when creating drive maps, or the like, for use in tourism.

The internal configuration of each of the communication terminals 1 and the server 2 will be described in detail.

Figure 2A:
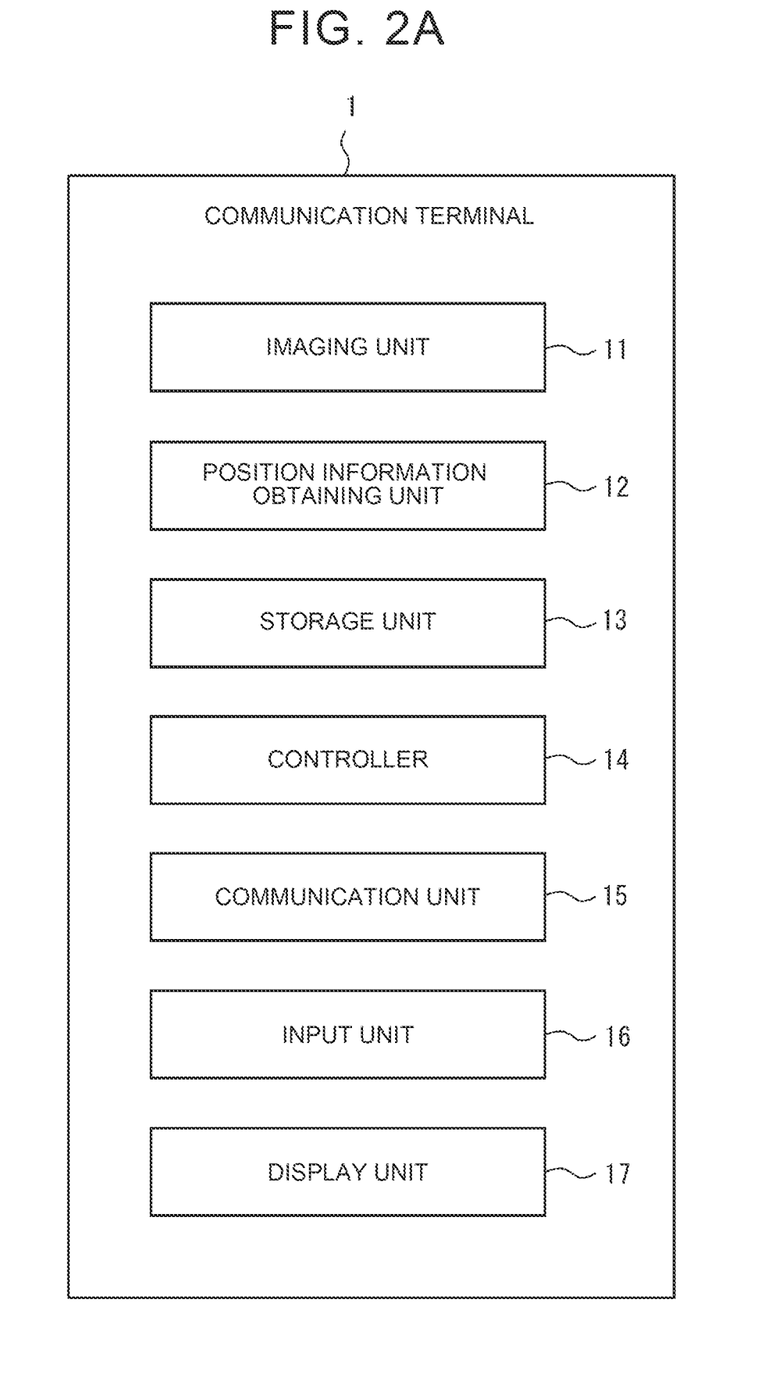
FIG. 2A is a functional block diagram of a communication terminal.

As shown in FIG. 2A, the communication terminal 1 includes an imaging unit 11, position information obtaining unit 12, storage unit 13, controller 14, communication unit 15, input unit 16, and display unit 17.

The imaging unit 11 includes a so-called vehicle-mounted camera, and takes a video of the outside (in front of the vehicle, for example). The imaging unit 11 may create a video of the outside, and record the created video in the storage unit 13.

The position information obtaining unit 12 includes one or more receivers corresponding to any satellite positioning system. For example, the position information obtaining unit 12 may include a GPS (Global Positioning System) receiver. The position information obtaining unit 12 detects position information indicating the position of the communication terminal 1. The position information obtaining unit 12 may further include an electronic compass, and may obtain information about a direction in which the communication terminal 1 is oriented.

The storage unit 13 includes one or more memories. Each of the memories may be a semiconductor memory, magnetic memory, or optical memory, for example, but is not limited to these. Each memory included in the storage unit 13 may function as a main storage device, auxiliary storage device, or cache memory, for example. The storage unit 13 may store information about results of analysis or processing by the controller 14. The storage unit 13 may store various kinds of information (e.g., a video obtained from the server 2) concerning operation or control of the communication terminal 1.

The controller 14 includes one or more processors. Each of the processors may be a general-purpose processor, or a dedicated processor for particular processing. For example, the controller 14 controls operation of the communication terminal 1 as a whole. The controller 14 controls other function units included in the communication terminal 1.

The communication unit 15 includes a communication module that performs communications between the communication terminal 1 and the server 2. The communication unit 15 may include a communication module connected to the network NW, or a communication module that complies with mobile communications standards, such as 4G (4th Generation) or 5G (5th Generation).

The input unit 16 detects user input, and includes an input interface that sends input information to the controller 14. For example, the input interface is in the form of physical keys, capacitive keys, touch screen provided integrally with a panel display, or a microphone that receives voice input. However, the input interface is not limited to these, but may be any input unit.

The display unit 17 includes a display interface, such as a panel display, which displays information created by the controller 14 or information read from the storage unit 13, to the user. In another embodiment in which the communication terminal 1 is a car navigation system, the display unit 17 may include a head-up display.

Figure 2B:
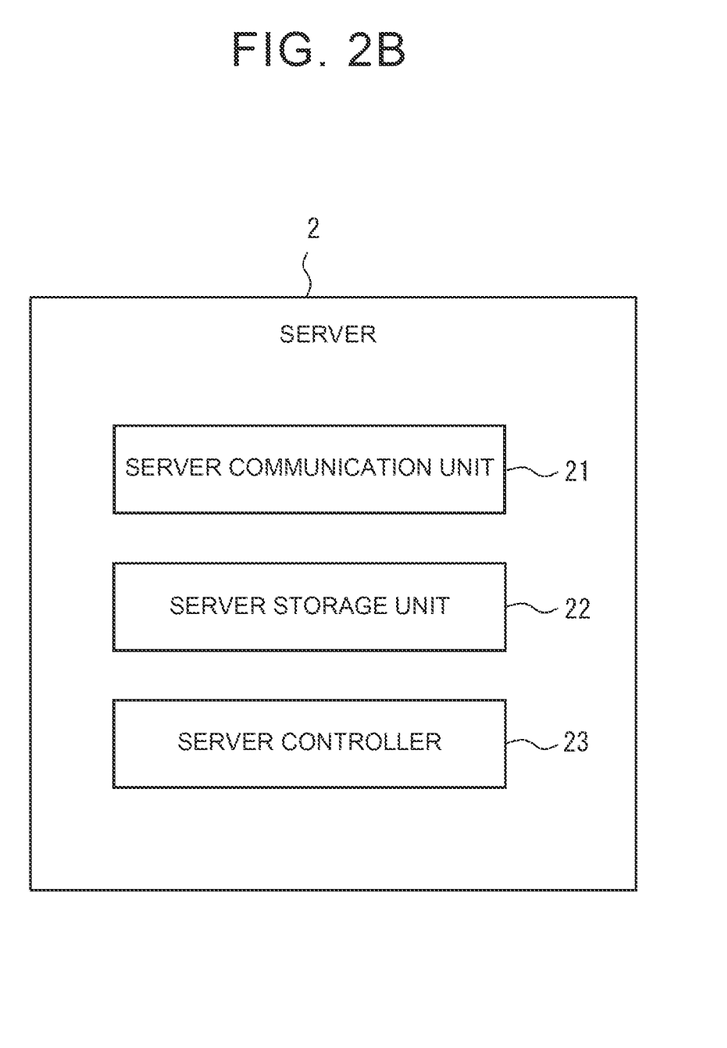
FIG. 2B is a functional block diagram of a server.

As shown in FIG. 2B, the server 2 includes a server communication unit 21, server storage unit 22, and server controller 23.

The server communication unit 21 includes a communication module that performs communications between the communication terminal 1 and the server 2. The server communication unit 21 may include a communication module connected to the network NW. The server communication unit 21 can obtain information generated from the communication terminal 1, and transmit the information to any other terminal connected to the server 2 via the network NW.

The server storage unit 22 includes one or more memories. Each memory included in the server storage unit 22 may function as a main storage device, auxiliary storage device, or cache memory, for example. The server storage unit 22 stores information generated from the communication terminal 1, for example. The server storage unit 22 may store a server control program, or various programs concerning operation or control of the information processing system S as a whole.

The server controller 23 includes one or more processors. The server controller 23 controls the server communication unit 21 and the server storage unit 22, and also performs overall control concerning operation of the server 2 as a whole. For example, the server controller 23 can obtain a video from a traveling vehicle connected to the network NW, and obtain or determine various kinds of information from the video, through image analysis. For the image analysis, any image analyzing method, such as machine learning, may be employed.

In the following, control methods performed by the communication terminal 1 and the server 2 will be described in detail.

The server 2 receives a video having captured images in front of a vehicle, and vehicle position information and date-and-time information obtained at the time when the video was taken, from any one or more vehicles traveling on a road, via the network NW, and accumulates the information in the server storage unit 22. The server 2 stores vehicle type information of each vehicle in advance. The server 2 further stores road map information in advance, and determines the road on which the vehicle was traveling at the time when the video was taken, width of the road, and the traveling direction (e.g., up or down) of the vehicle on the road, from the road map information and the position information received from the vehicle. The server 2 determines the weather in the video, and the presence or absence of a caution-needed object (such as an obstacle, pedestrian who suddenly appeared on the road, or an accident scene), from the video. The server 2 may further calculate an evaluation value of the video, based on the imaging date and time at which the video was taken. For example, the evaluation value is higher as the imaging date and time is closer to the current time. The server 2 may also calculate the evaluation value, based on the quality of the video.

Figure 3:
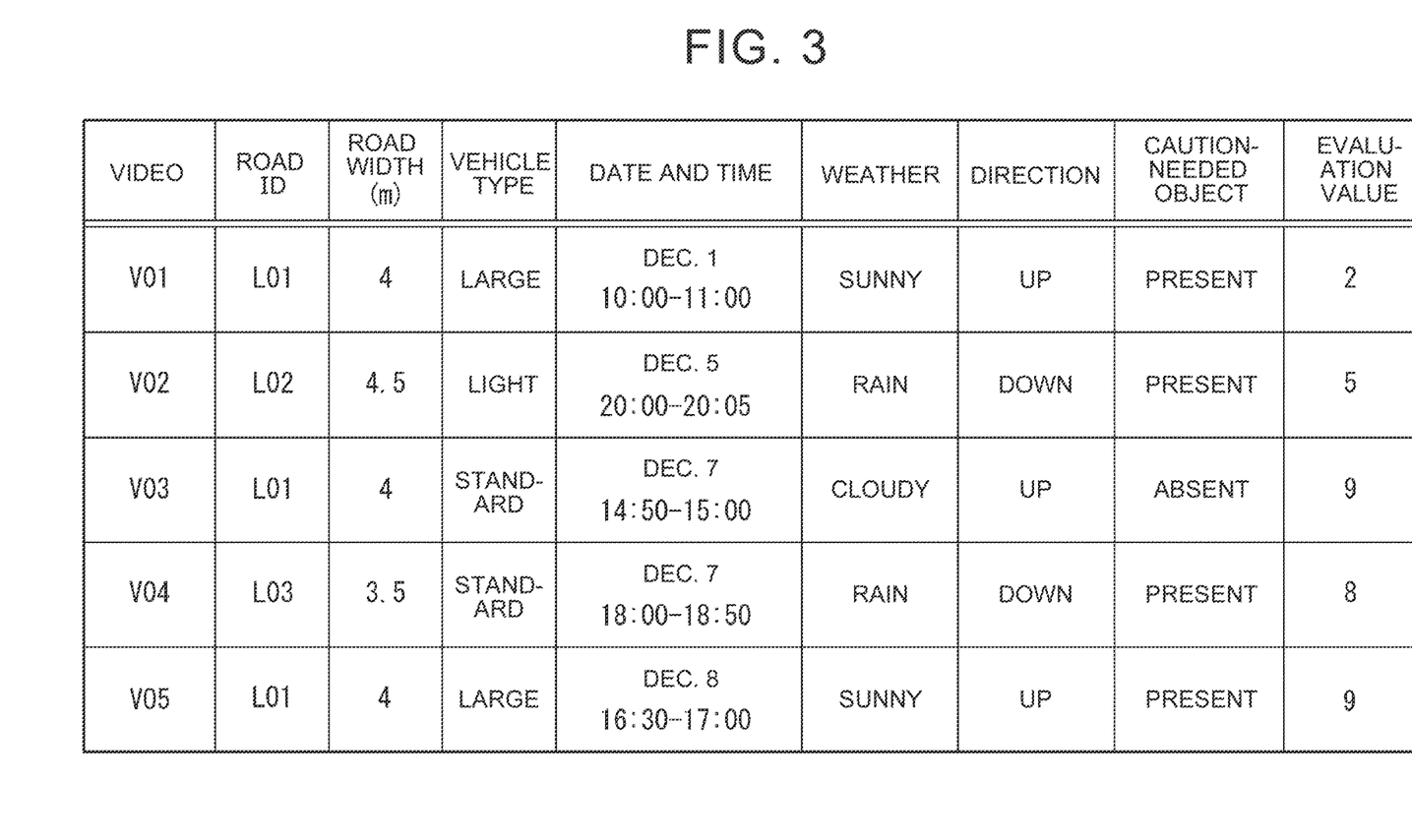
FIG. 3 is a view showing one example of data stored in the server.

The server 2 stores the video and the above metadata concerning the video, in a database of the server storage unit 22, as shown in FIG. 3. The metadata includes, for example, a road ID, road width, type of the vehicle, date and time at which the video was taken, weather in the video, traveling direction of the vehicle, presence of a caution-needed object, calculated evaluation value, etc., but is not limited to these items of information. In another embodiment, the metadata may further include a time slot (e.g., daytime, night) corresponding to the imaging date and time.

When two or more videos of which given items other than the item used for calculation of the evaluation value have the same values are associated with the same road, the server 2 can delete videos other than the video having the highest evaluation value. For example, the server 2 determines that given items (in this example, the vehicle type, weather, direction, and presence of a caution-needed object) other than the date and time, of video V01 have the same values as those of video V05, with respect to the same road L1. In this case, the server 2 determines that the evaluation value of video V01 is 2, and that of video V05 is 9, and deletes video V01. As an alternative example, the server 2 may delete videos of which evaluation values are equal to or smaller than a predetermined value.

The communication terminal 1 receives a request to search for a scheduled traveling route, from the user, via the input unit 16.

The communication terminal 1 informs the server 2 of information (for example, a point of departure and a destination) concerning the scheduled traveling route.

The server 2 searches for and determines the scheduled traveling route, from the information concerning the scheduled traveling route. The server 2 extracts a video corresponding to each of one or more roads that constitute the scheduled traveling route thus determined, from the server storage unit 22. The server 2 sends the extracted video and at least one of the items associated with the video, to the communication terminal 1.

Once the communication terminal 1 obtains the video, it displays the obtained video on the display unit 17, according to the scheduled traveling route of the vehicle. When the communication terminal 1 obtains two or more videos, it connects and displays the two or more videos.

Figure 4A:
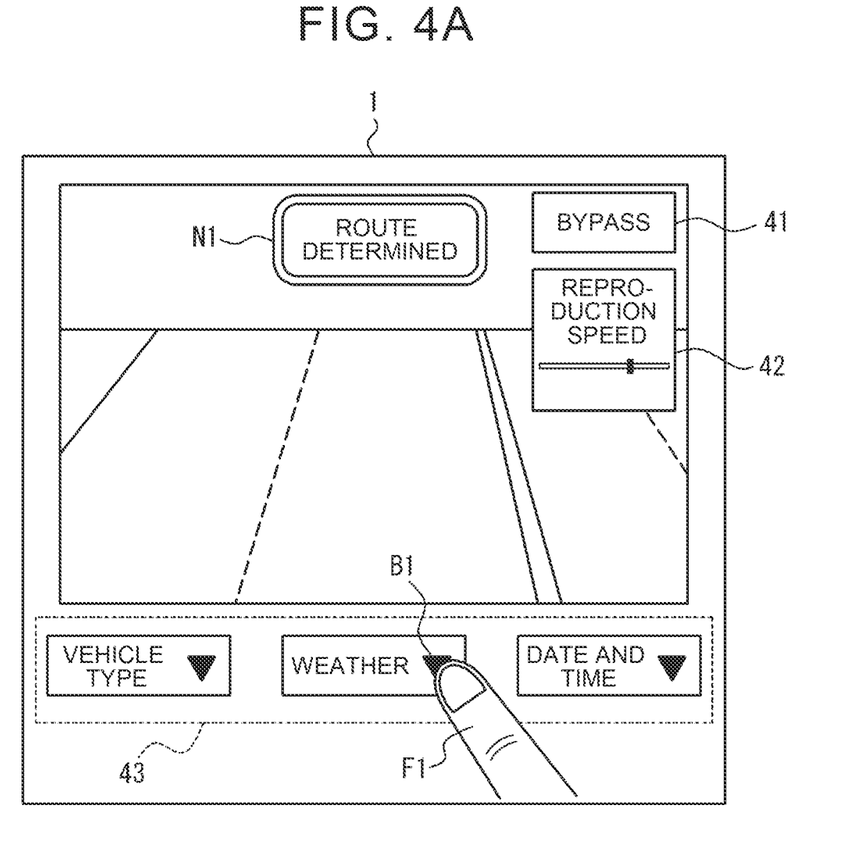
FIG. 4A is a view showing a first screen example of the communication terminal.

One example of a video image displayed on the display unit 17 is shown in FIG. 4A. As shown in FIG. 4A, the communication terminal 1 may display notification N1 indicating that the scheduled traveling route has been determined. The communication terminal 1 may further display an area 41 on the display unit 17. When the communication terminal 1 receives a user selection for the area 41, it requests the server 2 to search for and determine a new scheduled traveling route that bypasses the road corresponding to the video image that is being displayed. The server 2 obtains, from the server storage unit 22, a video corresponding to each of one or more roads that constitute the new scheduled traveling route thus determined, and sends the video to the communication terminal 1. The communication terminal 1 displays the video obtained from the server 2, on the display unit 17.

In another embodiment, the server 2 stores the vehicle width of the vehicle on which the communication terminal 1 is installed. The server 2 may determine whether the vehicle on which the communication terminal 1 is installed can travel on the road, from the vehicle width, and the width of the road in the video image. More specifically, the server 2 compares the road width with a value obtained by adding a given margin value to the vehicle width. When the road width is equal to or larger than the obtained value, the server 2 determines that the vehicle can travel on the road. On the other hand, when the road width is smaller than the obtained value, the server 2 determines that the vehicle cannot travel on the road, and determines whether the vehicle can travel on another road that bypasses the road in question. The server 2 obtains, from the server storage unit 22, a video corresponding to each of one or more roads that constitute the scheduled traveling route, when the server 2 determines that the vehicle can travel on the above-indicated one or more roads. The server 2 sends the obtained video to the communication terminal 1. In an alternative example, when the communication terminal 1 determines that a road that constitutes the scheduled traveling route includes a caution-needed object, it may search for a new scheduled traveling route that includes no caution-needed object.

As shown in FIG. 4A, the communication terminal 1 displays the reproduction speed of the video in an area 42. The communication terminal 1 may change the video reproduction speed, according to the content of the video that is being displayed. For example, during display of a video, the communication terminal 1 displays the video at a standard speed when a caution-needed object is displayed, and fast-forwards and displays the video when no caution-needed object is displayed.

Figure 4B:
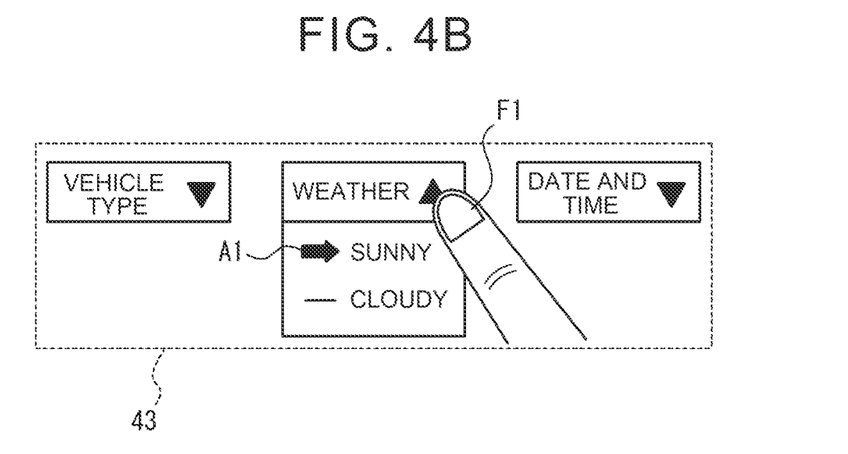
FIG. 4B is a view showing a screen displayed when a part of the screen shown in FIG. 4A is selected.

When there is another video associated with the road corresponding to the video that is being displayed, the communication terminal 1 displays items associated with each of the videos, such that one or more can be selected from the items. For example, the case where the communication terminal 1 displays video V05 will be described. As shown in FIG. 3, road L01 corresponding to video V05 is also associated with another video V03. The communication terminal 1 displays the vehicle type, weather, and date and time in an area 43 shown in FIG. 4A, such that they are selectable. When the communication terminal 1 receives a user selection F1 for button B1 shown in FIG. 4A, weather (i.e., sunny) associated with video V05 and weather (i.e., cloudy) associated with video V03 are displayed such that one of these weathers can be selected, as shown in FIG. 4B. Arrow A1 indicates the weather associated with video V05 that is being displayed. When the communication terminal 1 receives a user selection for the weather (cloudy) associated with video V03, it obtains video V03 from the server 2, and displays it on the display unit 17, in place of video V05.

Figure 5:
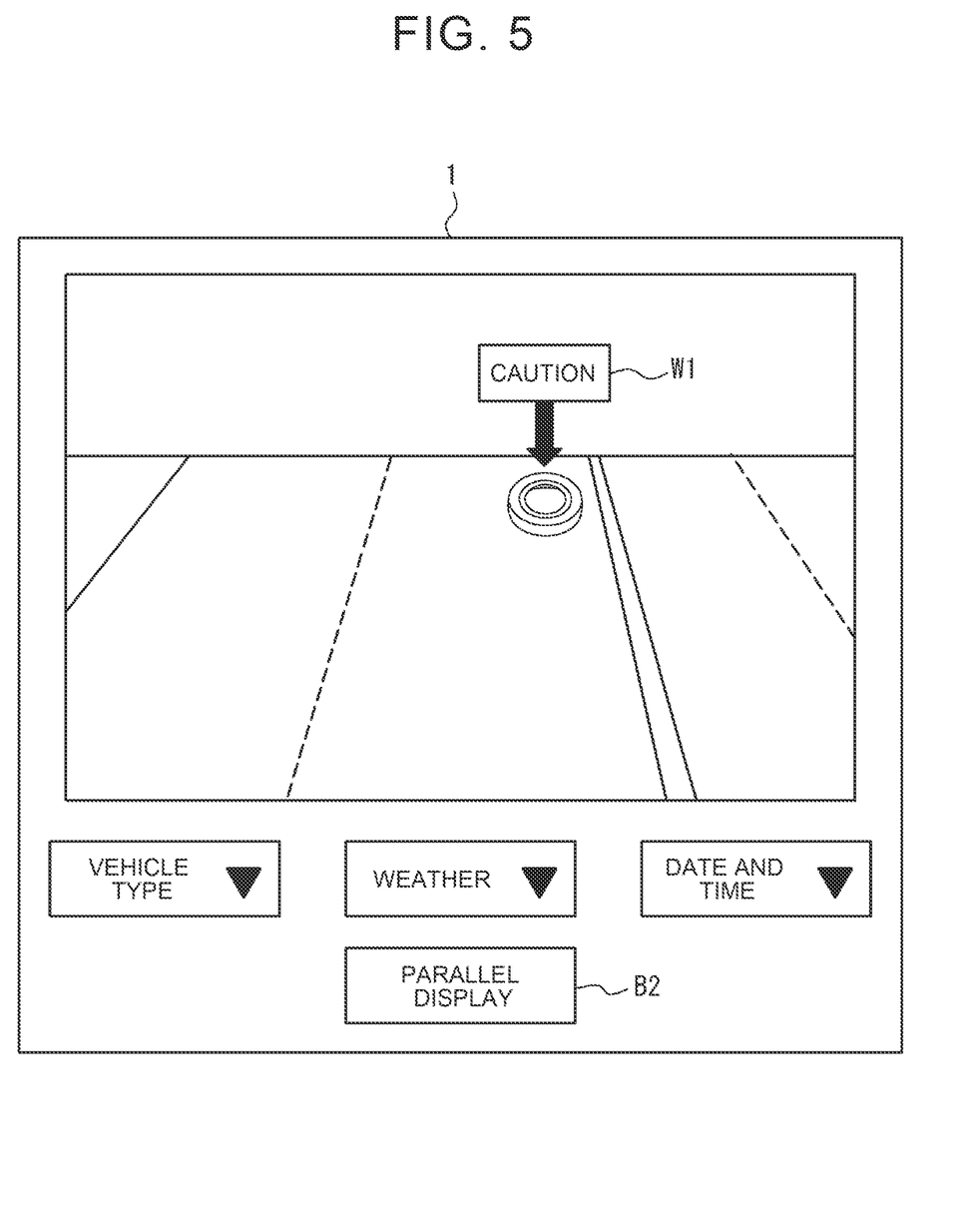
FIG. 5 is a view showing a second screen example of the communication terminal.

When the video that is being displayed includes a caution-needed object, the communication terminal 1 may display an alarm display WI along with the caution-needed object, as shown in FIG. 5.

Figure 6:
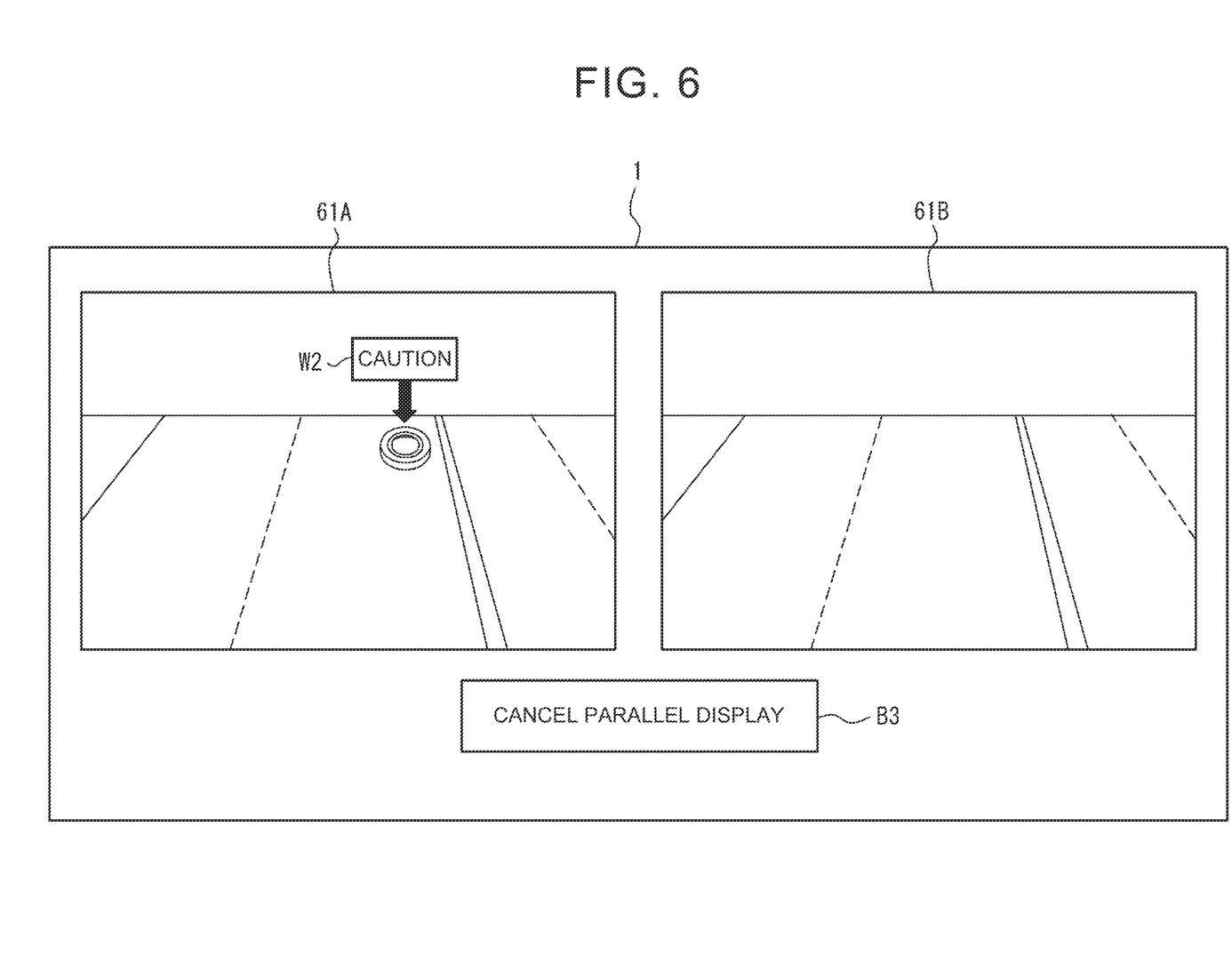
FIG. 6 is a view showing a third screen example of the communication terminal.

When a video having a caution-needed object and another video having no caution-needed object are associated with the road corresponding to the video that is being displayed, the communication terminal 1 may display a button B2 that permits these videos to be displayed in parallel, as shown in FIG. 5. When receiving a user selection for the button B2, the communication terminal 1 obtains the other video having no caution-needed object from the server 2. As shown in FIG. 6, the communication terminal 1 displays a video 61A having a caution-needed object, and a video 61B having no caution-needed object, in parallel with each other. At this time, the communication terminal 1 may adjust the reproduction speed of at least one of the video 61A and video 61B, such that the position displayed in the video 61A is substantially the same as the position displayed in the video 61B. The communication terminal 1 cancels or stops the parallel display, once it receives a user selection for a button B3.

Figure 7:
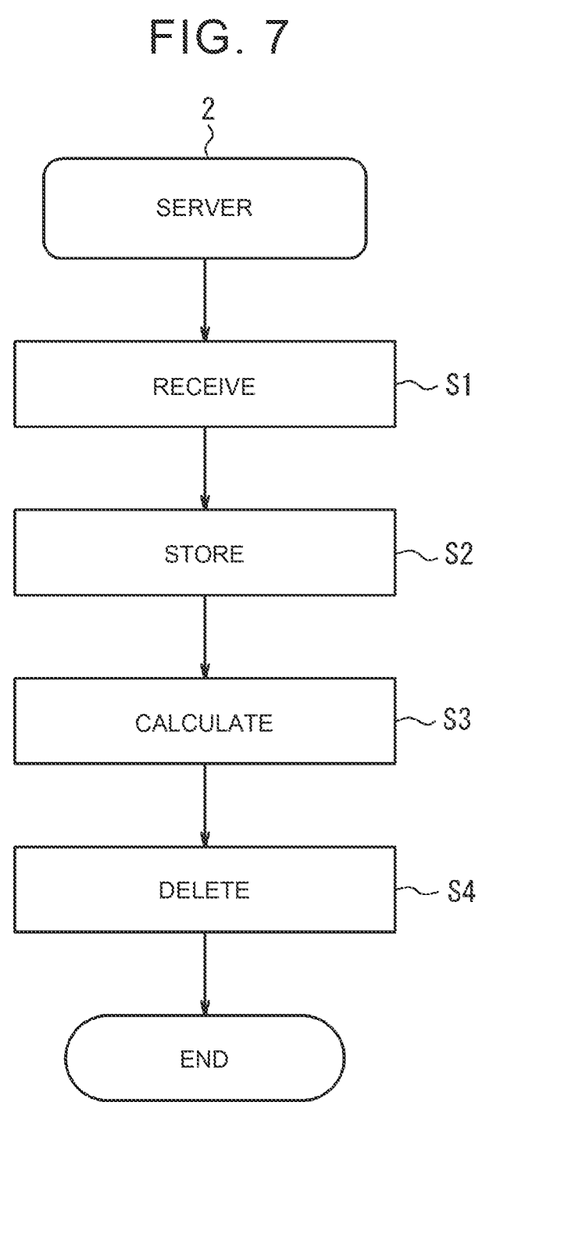
FIG. 7 is a flowchart of a process performed in the server.

FIG. 7 shows a flowchart illustrating a process performed by the server 2 at any given point in time.

Step S1: the server 2 receives videos from one or more vehicles.

Step S2: the server 2 stores the received videos in the server storage unit 22, such that each of the videos is associated with a corresponding road.

Step S3: the server 2 calculates an evaluation value for each video. The method of calculation has been described above, and thus will not be described herein.

Step S4: the server 2 deletes a video or videos other than the one having the highest evaluation value.

Figure 8:
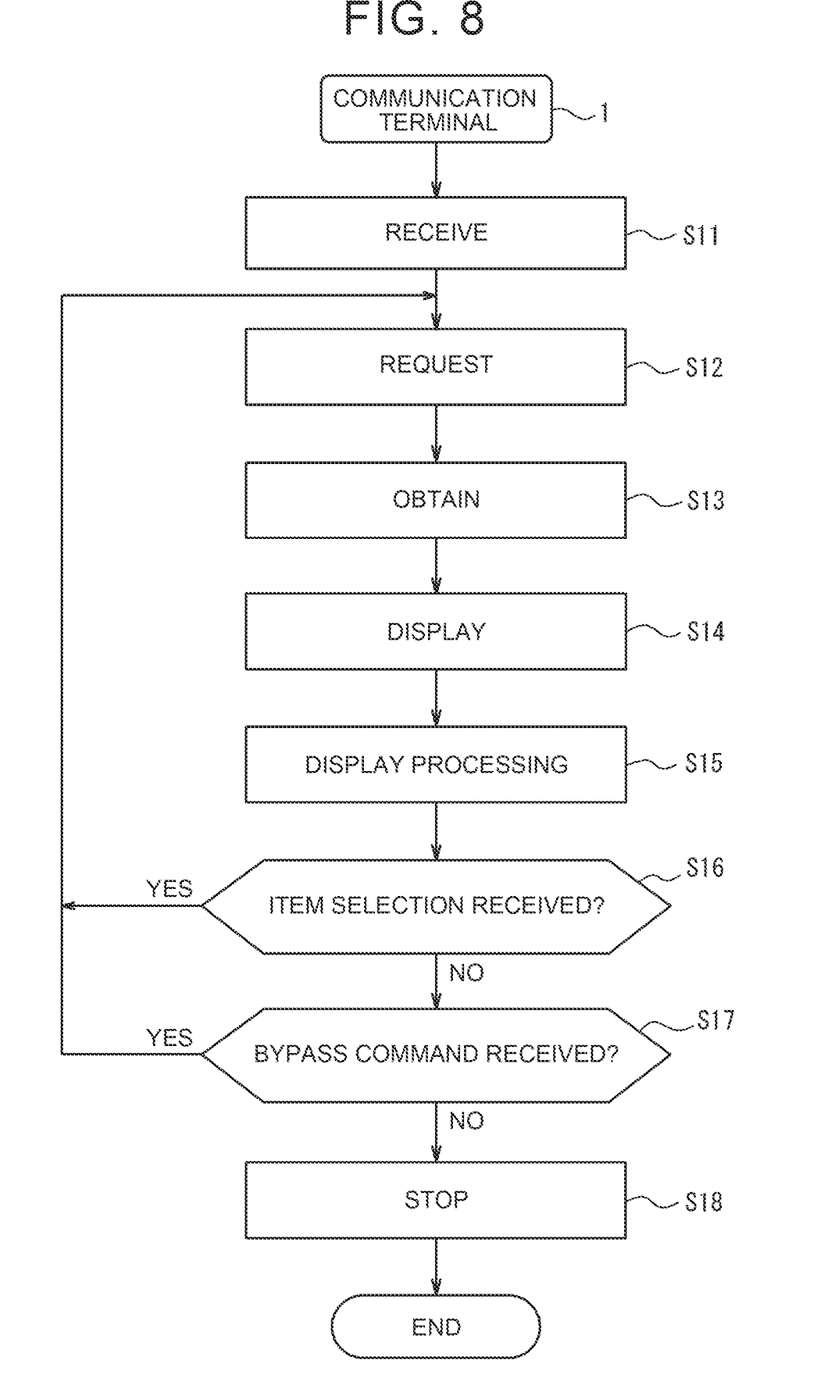
FIG. 8 is a flowchart of a process performed in the communication terminal.

FIG. 8 shows a flowchart illustrating a process performed by the communication terminal 1 at any given point in time.

Step S11: the communication terminal 1 receives a request to search for a scheduled traveling route, from the user.

Step S12: the communication terminal 1 requests the server 2 to determine the scheduled traveling route, and send a video corresponding to each of one or more roads that constitute the scheduled traveling route thus determined.

Step S13: the communication terminal 1 obtains the video from the server 2.

Step S14: the communication terminal 1 displays the video obtained from the server 2.

Step S15: the communication terminal 1 performs predetermined display processing (e.g., change of the reproduction speed), on the video that is being displayed.

Step S16: the communication terminal 1 determines whether it has received a selection regarding an item(s) (e.g., the vehicle type, date and time, weather, etc.) associated with the video, from the user.

Step S17: when the communication terminal 1 determines that it has not received selection of the item(s) from the user (NO in step S16), the communication terminal 1 determines whether it has received a command for bypassing the road corresponding to the video that is being displayed, from the user.

Step S18: when the communication terminal 1 has not received the command for bypassing the road, from the user (NO in step S17), it displays the video received from the server 2, to the end, and then stops display of the video.

As described above, according to this embodiment, the server 2 stores videos taken by any vehicle during traveling, in the server storage unit 22, such that each video is associated with a road on which the vehicle is traveling, and determines the scheduled traveling route, in response to a request from the communication terminal 1. The server 2 obtains a video corresponding to each of one or more roads that constitute the scheduled traveling route, from the server storage unit 22, and sends the video to the communication terminal 1 so that the video is displayed on the terminal 1. Thus, the server 2 assists the driver to recognize conditions of the scheduled traveling route on which the vehicle is going to travel, to thus improve the technology of providing videos concerning the scheduled traveling route of the vehicle.

Also, according to this embodiment, the server 2 determines a scheduled traveling route that bypasses the road corresponding to the video that is being displayed on the communication terminal 1, in response to a request for bypassing from the communication terminal 1 that is displaying the video. The server 2 obtains a video corresponding to each of one or more roads that constitute the scheduled traveling route thus determined, from the server storage unit 22. The server 2 sends the obtained video to the communication terminal 1. With this arrangement, when it is difficult for the vehicle to go through the road corresponding to the video that is being displayed, the server 2 enables the user to easily search for a detour, for improvement of the convenience of the user.

Also, according to this embodiment, the server 2 stores the vehicle width of the vehicle on which the communication terminal 1 is installed, and determines whether the vehicle on which the communication terminal 1 is installed can travel on the road, from the road width and the vehicle width. The server 2 obtains a video corresponding to each of one or more roads that constitute the scheduled traveling route when it determines that the vehicle can travel on the one or more roads, from the server storage unit 22, and sends the obtained video to the communication terminal 1. With this arrangement, the server 2 can reduce a possibility that the user travels on a road that is difficult to go through.

Also, according to this embodiment, the server 2 stores at least one of the items as follows, in association with a video taken by the vehicle. The items include the width of the road, vehicle type of the vehicle, date and time at which the video was taken, weather in the video, traveling direction of the vehicle, and the presence of a caution-needed object in the video. With this arrangement, the server 2 provides the above-indicated various kinds of information associated with the video, to the communication terminal 1, so that the information is useful in recognition of conditions of the scheduled traveling route.

Also, according to this embodiment, the server 2 calculates the evaluation value for each video, based on the items including the date and time at which the video was taken. When two or more videos of which given items other than the above items (date and time) have the same values are associated with the same road, the server 2 deletes a video or videos other than the one having the highest evaluation value. Thus, the server 2 can reduce the amount of data stored in the server 2.

According to this embodiment, the communication terminal 1 requires the server 2 to send a video corresponding to each of one or more roads that constitute the scheduled traveling route of the vehicle, obtains the video from the server 2, stores the video in the storage unit 13, and displays the obtained video on the display unit 17, in the order according to the scheduled traveling route. With this arrangement, the communication terminal 1 can assist the user to recognize conditions of the scheduled traveling route on which the vehicle is going to travel.

Also, according to this embodiment, the communication terminal 1 changes the reproduction speed of the video according to the content of the video. Thus, the communication terminal 1 reproduces a video having a relatively high necessity of being viewed, at a relatively slow speed, and reproduces a video that need not be viewed so much, at a relatively high speed. In this manner, the communication terminal 1 can let the user check the former video with certainty, and check the latter video in a short time.

Also, according to this embodiment, each video is associated with at least one item of the vehicle type of the vehicle that took the video, date and time at which the video was taken, and the weather in the video. When two or more videos are associated with the same road, the communication terminal 1 displays at least one item on the display unit 17 to permit selection, and displays a video that meets the user selection. In this manner, the communication terminal 1 can provide a video that matches conditions desired by the user.

Also, according to this embodiment, the communication terminal 1 notifies the user of a caution-needed object during driving, while the video is being displayed. With this arrangement, the communication terminal 1 can call the user's attention to the object, so as to reduce the possibility of occurrence of accidents.

Also, according to this embodiment, when a certain video is associated with a first video taken when the vehicle travels on a road in the presence of a caution-needed object, and a second video taken when the vehicle travels on the same road in the absence of the caution-needed object, the communication terminal 1 displays the first video and the second video arranged in parallel with each other, on the display unit 17. Even if the caution-needed object is detected in the video that is being displayed, the object may be eliminated at present. Thus, the communication terminal 1 displays the video having no caution-needed object, side by side with the video having the object, so that it can assist the user to determine whether the vehicle can easily go through the road.

While the disclosure has been described above based on the drawings and the embodiments, it is to be understood that various changes and modifications can be easily made by those skilled in the art, based on this disclosure. Accordingly, it is to be noted that these changes and modifications are included in the scope of the disclosure. For example, functions, etc. included in respective means or steps can be re-arranged unless they are logically inconsistent, and two or more means or steps may be combined into one, or may be divided.

In the illustrated embodiment, the communication terminal 1 displays the vehicle type, weather, and date and time, in the area 43 shown in FIG. 4A, such that the user can make a selection on these items. However, in another embodiment, the communication terminal 1 may further display the presence or absence of a caution-needed object, such that the user can select the presence or absence of the object.

In the illustrated embodiment, the server 2 searches for the scheduled traveling route. However, in another embodiment, the communication terminal 1 may search for a scheduled traveling route, and inform the server 2 of the scheduled traveling route thus found. The server 2, which has been informed of the route, obtains a video corresponding to each of one or more roads that constitute the scheduled traveling route, from the server storage unit 22, and sends the obtained video to the communication terminal 1.

Any vehicle or server may be configured to function as the communication terminal 1 or server 2 according to the illustrated embodiment. More specifically, a program that describes the content of processing for implementing each function of the communication terminal 1 or server 2 according to the embodiment is stored in a memory of the vehicle or server, and the program is read and executed by a processor of the vehicle or server. Thus, the disclosure covering this embodiment can be practiced in the form of the program that can be run by the processor.

What is claimed is:

1. A server, comprising:
server controller circuitry;
server communication interface circuitry configured to connect to a communication terminal; and
server memory circuitry,
wherein the server controller circuitry is configured to store a video taken by a vehicle during traveling, in the server memory circuitry, such that the video is associated with a road on which the vehicle is traveling;
the server controller circuitry is configured to evaluate each video stored in the server memory circuitry based on at least one item including a date and time at which the video was taken; and
when two or more videos of which each predetermined item other than the at least one item has the same value are associated with the same road, the server controller circuitry is configured to delete one or more of the two or more videos other than a video having a predetermined evaluation.

2. The server according to claim 1, wherein the server controller circuitry is configured to:
determine a scheduled traveling route that bypasses a road corresponding to a video that is being displayed on the communication terminal, in response to a request for bypassing from the communication terminal that is displaying the video; and obtain a video corresponding to each of one or more roads that constitute the scheduled traveling route, from the server memory circuitry, and send the obtained video to the communication terminal.

3. The server according to claim 1, wherein:
the server memory circuitry stores a vehicle width of the vehicle on which the communication terminal is installed;
the server controller circuitry is configured to determine whether the vehicle on which the communication terminal is installed is able to travel on the road, based on a road width of the road and the vehicle width; and
the server controller circuitry is configured to obtain a video corresponding to each of one or more roads that constitute the scheduled traveling route, from the server memory circuitry, when the server controller circuitry determines that the vehicle is able to travel on the one or more roads, and send the obtained video to the communication terminal.

4. The server according to claim 1, wherein the server memory circuitry stores, in association with the video taken by the vehicle, at least one of a road width of the road, a vehicle type of the vehicle, a date and time at which the video was taken, a weather in the video, and a traveling direction of the vehicle.

5. The server according to claim 1, wherein the server memory circuitry stores map information corresponding to the video taken by the vehicle.

6. The server according to claim 1, wherein the server memory circuitry stores an indication of whether the video taken by the vehicle includes a caution-needed object.

7. The server according to claim 1, wherein the video having a predetermined evaluation has a highest evaluation of the two or more videos.

8. A method for a server comprising:
storing, by server controller circuitry, a video taken by a vehicle during traveling, in server memory circuitry of the server, such that the video is associated with a road on which the vehicle is traveling;
evaluating, by the server controller circuitry, each video stored in the server memory circuitry based on at least one item including a date and time at which the video was taken; and
when two or more videos of which each predetermined item other than the at least one item has the same value are associated with the same road, deleting, by the server controller circuitry, one or more of the two or more videos other than a video having a predetermined evaluation.

9. The method according to claim 8, further comprising:
determining a scheduled traveling route that bypasses a road corresponding to a video that is being displayed on a communication terminal that communicates with the server, in response to a request for bypassing from the communication terminal that is displaying the video; and
obtaining a video corresponding to each of one or more roads that constitute the scheduled traveling route, from the server memory circuitry, and send the obtained video to the communication terminal.

10. The method according to claim 8, further comprising:
storing, in server memory circuitry of the server, a vehicle width of the vehicle on which a communication terminal is installed;
determining whether the vehicle on which the communication terminal is installed is able to travel on the road, based on a road width of the road and the vehicle width; and
obtaining a video corresponding to each of one or more roads that constitute the scheduled traveling route, from the server memory circuitry, when the vehicle is able to travel on the one or more roads, and sending the obtained video to the communication terminal.

11. The method according to claim 8, further comprising storing, in server memory circuitry of the server and in association with the video taken by the vehicle, at least one of a road width of the road, a vehicle type of the vehicle, a date and time at which the video was taken, a weather in the video, and a traveling direction of the vehicle.

12. The method according to claim 8, further comprising storing, in a server memory circuitry of the server, map information corresponding to the video taken by the vehicle.

13. The method according to claim 8, further comprising storing, in server memory circuitry of the server, an indication of whether the video taken by the vehicle includes a caution-needed object.

14. The method according to claim 8, wherein the video having a predetermined evaluation has a highest evaluation of the two or more videos.

15. A system, comprising:
a communication terminal; and
a server including:
server controller circuitry,
server communication interface circuitry configured to connect to a communication terminal, and
server memory circuitry,
wherein the server controller circuitry is configured to store a video taken by a vehicle during traveling, in the server memory circuitry, such that the video is associated with a road on which the vehicle is traveling,
the server controller circuitry is configured to evaluate each video stored in the server memory circuitry based on at least one item including a date and time at which the video was taken, and
when two or more videos of which each predetermined item other than the at least one item has the same value are associated with the same road, the server controller circuitry is configured to delete one or more of the two or more videos other than a video having a predetermined evaluation.

16. The system according to claim 15, wherein the server controller circuitry is configured to:
determine a scheduled traveling route that bypasses a road corresponding to a video that is being displayed on the communication terminal, in response to a request for bypassing from the communication terminal that is displaying the video, and
obtain a video corresponding to each of one or more roads that constitute the scheduled traveling route, from the server memory circuitry, and send the obtained video to the communication terminal.

17. The system according to claim 15, wherein:
the server memory circuitry stores a vehicle width of the vehicle on which the communication terminal is installed,
the server controller circuitry is configured to determine whether the vehicle on which the communication terminal is installed is able to travel on the road, based on a road width of the road and the vehicle width, and the server controller circuitry is configured to obtain a video corresponding to each of one or more roads that constitute the scheduled traveling route, from the server memory circuitry, when the server controller circuitry determines that the vehicle is able to travel on the one or more roads, and send the obtained video to the communication terminal.

18. The system according to claim 15, wherein the server memory circuitry stores, in association with the video taken by the vehicle, at least one of a road width of the road, a vehicle type of the vehicle, a date and time at which the video was taken, a weather in the video, and a traveling direction of the vehicle.

19. The system according to claim 15, wherein the server memory circuitry stores map information corresponding to the video taken by the vehicle.

20. The system according to claim 15, wherein the server memory circuitry stores an indication of whether the video taken by the vehicle includes a caution-needed object.

* * * * *